UNITED STATES PATENT OFFICE.

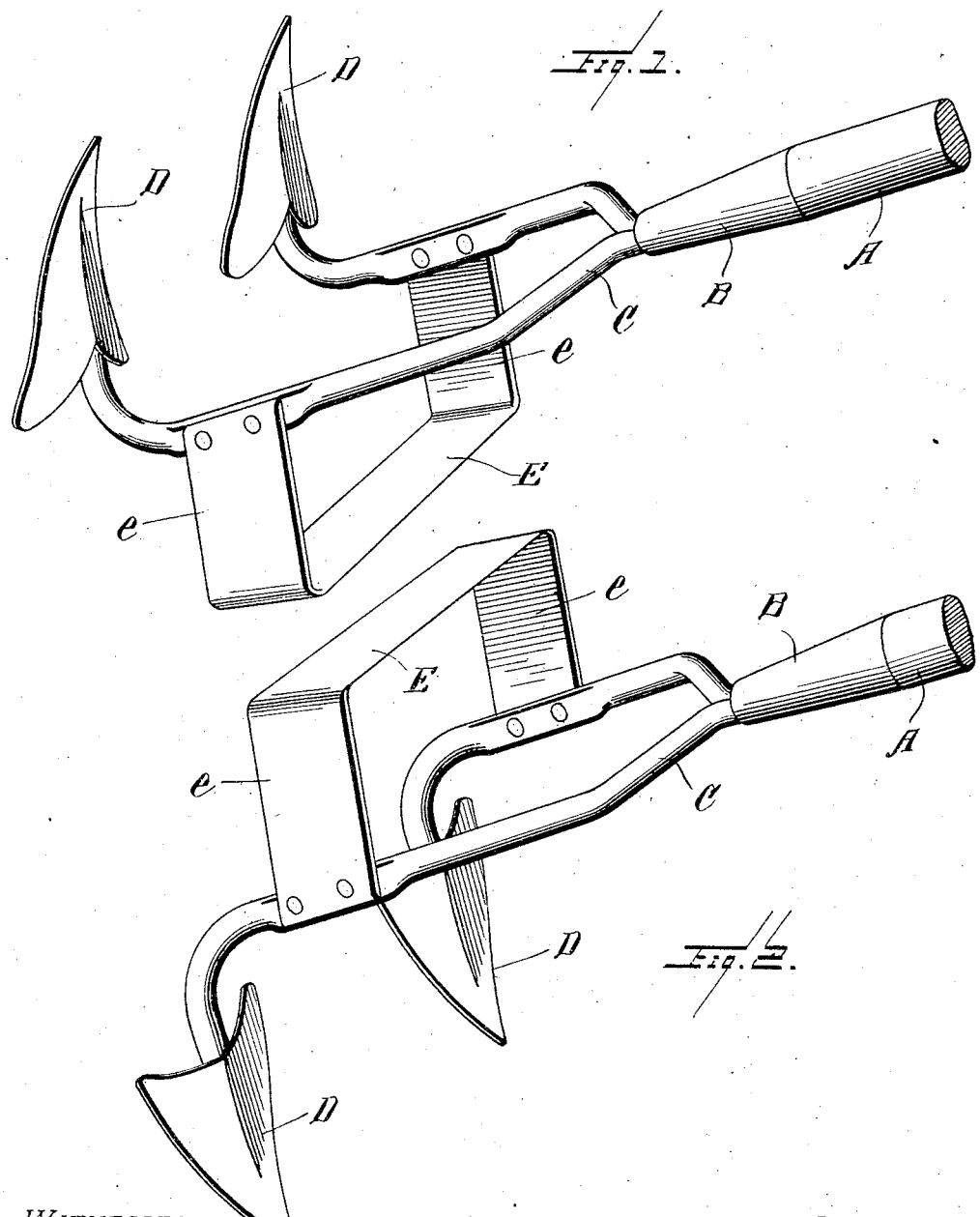

CHARLES S. STEVENS, OF CONNEAUT, OHIO.

GARDEN IMPLEMENT.

No. 857,684.  Specification of Letters Patent.  Patented June 25, 1907.

Application filed December 13 1906. Serial No. 347,603.

*To all whom it may concern:*

Be it known that I, CHARLES S. STEVENS, a citizen of the United States, residing at Conneaut, in the county of Ashtabula and State of Ohio, have invented certain new and useful Improvements in Garden Implements; and I do hereby declare the following to be a full, clear, and exact description of the invention, such as will enable others skilled in the art to which it appertains to make and use the same.

This invention relates to hand operated garden tools adapted to be used for two purposes; and consists in the construction and combination constituting a combined cultivator and weeder, substantially as hereinafter set forth and claimed.

In the accompanying drawings, Figure 1 represents an implement embodying my invention in position to be used as a weeder; Fig. 2 represents the same in position to be used as a cultivator.

A designates the wooden handle, which may be substantially like that of a hoe; B, a metal socket fitted on the end thereof; C, two bent diverging rods, which, after diverging, extend rearward in straight parallel lines and are then bent downward, with reference to the position of the implement for cultivating; and D, two pointed cultivator teeth of arrow-head outline, convex forward surface and slight forward bend at their points.

E designates a strong steel bar or weeding blade having a forward edge arranged at an angle to the parallel straight parts of rods C for convenience in weeding and having integral side pieces *e*, which are rigidly attached at their ends to the parallel straight parts of the said rods. These rods are braced securely and held from being bent toward or from each other by said bar E, which thus greatly increases the efficiency and durability of the tool when used as a cultivator or stirring hoe. When said implement is inverted and used as a weeder, the said bar of course is equally effective in strengthening the tool and also presents at the most serviceable angle a blade sufficiently long to take in all the weeds of a strip equal in width to the distance between the two cultivator teeth.

By simply turning the handle A the implement is changed at once from one article to the other, so may be used in rapid alternation first to shear off the weeds and then to stir up the soil below or at the side of the same, the bar C being an important coöperative element in both instances. In use the implement is of course given the striking and drawing movement of a hoe, whichever side may be utilized.

Having thus described my invention, what I claim as new and desire to secure by Letters Patent is:

A reversible garden tool composed of a handle, a socket, two partly diverging rods having their rear ends fitted into said socket, two pointed cultivator teeth D fixed on the downwardly bent operative ends of said rods and a U-shaped bracing bar E connected to the straight parallel middle parts of said rods and preventing the latter from bending laterally, the middle part of said bar being arranged at an angle to the straight parallel middle parts of said rods and provided with an edge for scraping or weeding when the tool is reversed substantially as set forth.

In testimony whereof, I have signed my name to this specification in the presence of two subscribing witnesses.

CHARLES S. STEVENS.

Witnesses:
S. C. ANDREWS,
JULIA S. ANDREWS.